(No Model.) 2 Sheets—Sheet 1.

J. B. WARREN.
SPRINKLER FOR HORTICULTURAL AND OTHER PURPOSES.

No. 368,259. Patented Aug. 16, 1887.

WITNESSES.
INVENTOR (No Model.) 2 Sheets—Sheet 2.
J. B. WARREN.
SPRINKLER FOR HORTICULTURAL AND OTHER PURPOSES.
No. 368,259. Patented Aug. 16, 1887.
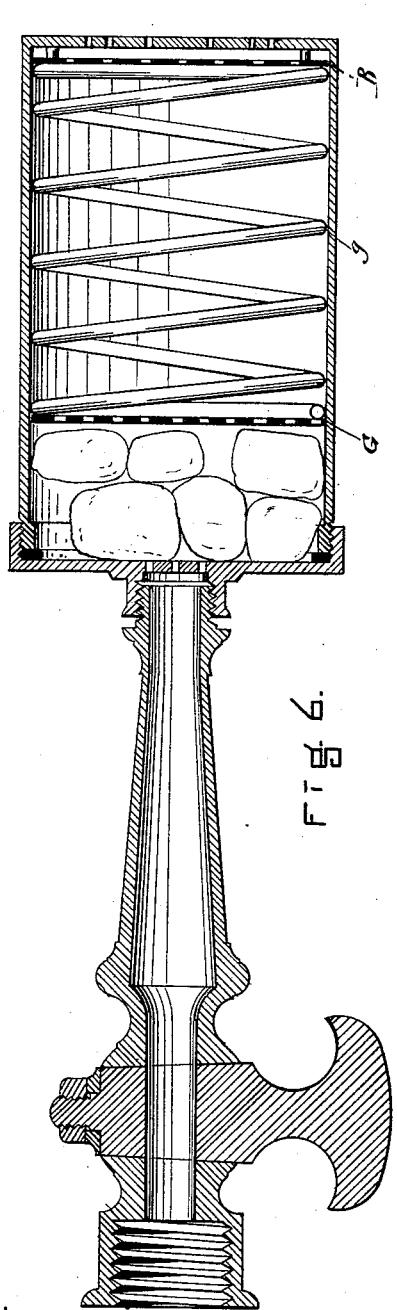
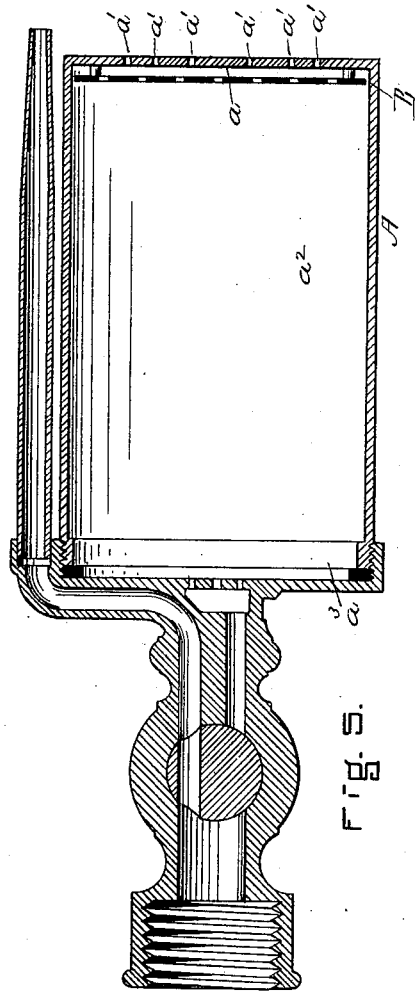

UNITED STATES PATENT OFFICE.

JOHN BENEDICT WARREN, OF WAKEFIELD, MASSACHUSETTS, ASSIGNOR OF ONE-HALF TO WILLARD LAWRENCE HAWES, OF SAME PLACE.

SPRINKLER FOR HORTICULTURAL AND OTHER PURPOSES.

SPECIFICATION forming part of Letters Patent No. 368,259, dated August 16, 1887.

Application filed September 30, 1886. Serial No. 214,916. (No model.)

*To all whom it may concern:*

Be it known that I, JOHN BENEDICT WARREN, of Wakefield, in the county of Middlesex and State of Massachusetts, a citizen of the United States, have invented a new and useful Improvement in Sprinklers for Horticultural and other Purposes, of which the following is a full, clear, and exact description, reference being had to the accompanying drawings, forming a part of this specification, in explaining its nature.

The invention relates to a sprinkler or device adapted to apply in the form of spray a solution of water and any composition or ingredient which will rapidly unite therewith or is dissolved thereby. It is especially adapted for use in all horticultural purposes, both for the purpose of applying insect powders and compositions and liquid manure or plant-food. It is also adapted for use in cleansing carpets and other fabrics and for a great variety of other purposes. It comprises a casing or vessel, preferably cylindrical in shape, and having perforations at one end, having a chamber or cavity of sufficient size to receive a composition or ingredient, and also a coupling by which it is secured to a hose or pipe, and a valve or cock for regulating the degree of water-pressure.

It further relates to the use or employment in connection with a sprinkler of this description of a tube or nozzle for discharging fluid or water in one stream, and a two-way cock or valve for governing the supply or head of the water, and for connecting the pipe or hose either with the sprinkler or with the single-discharge nozzle as desired.

It further relates to the employment in the sprinkler of a perforated or wire-gauze plate or diaphragm arranged in the distributer close to but not in contact with its perforated end.

It further relates to the employment of a movable plate within the distributer, which is adapted to be moved toward one end of the chamber to keep the ingredients placed therein in a somewhat compact body or mass.

It further relates to various details of construction, which will hereinafter be described.

Figure 2:
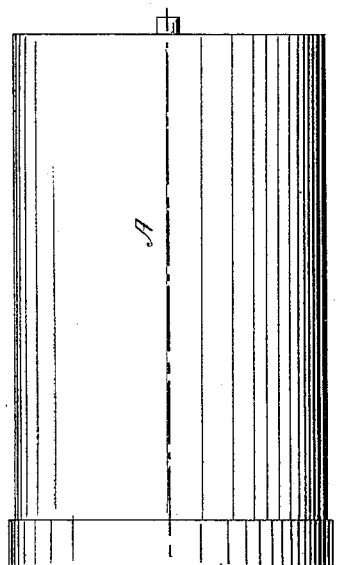
Figure 1:
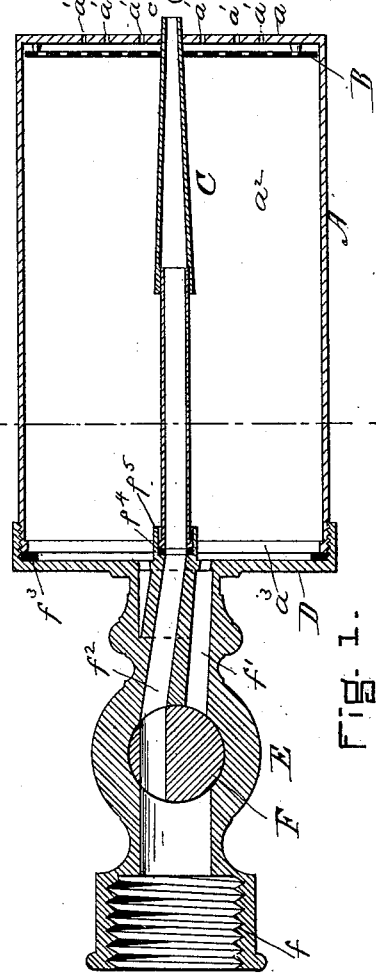
Figure 4:
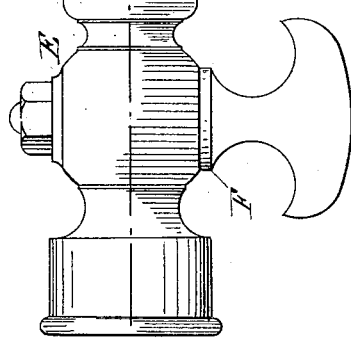
Figure 4:
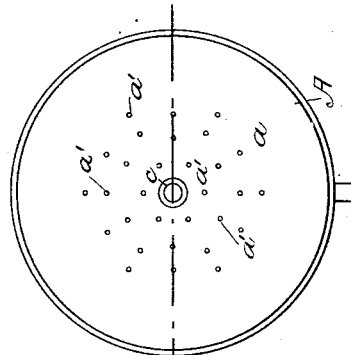
Figure 3:
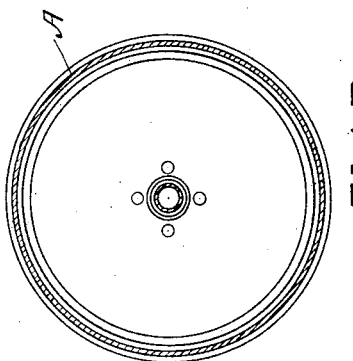

In the drawings, Figure 1 is a longitudinal central section of a device containing the features of my invention. Fig. 2 is a side elevation thereof. Fig. 3 is a view of the interior of the cap in elevation. Fig. 4 is an end elevation of the device. Figs. 5 and 6 are sections illustrating the various modifications hereinafter referred to.

A is a casing or shell cylindrical in form. It has the bottom or end $a$, provided with small holes or perforations $a'$, and the chamber or cavity $a^2$. It has within the cavity a perforated diaphragm or plate, B, which is placed above the perforated bottom or end, so as to leave a clear space between it and the bottom or end. The case or shell also has the opening $a^3$ and the tube or nozzle C, which is represented as centrally arranged therein, and which extends through the bottom or end of the casing to form the extension $c$. The shell or receptacle also has a cap, D, which is adapted to screw upon the open end of the casing, and which is secured to or formed upon the end of the pipe or coupling E. The pipe or coupling has a two way cock, F, the coupling $f$, and two sets of passages, $f'$ $f^2$, connecting the valve-chamber, respectively, with the cavity of the casing A and with the nozzle C, the passage $f'$ connecting the valve-chamber with the former, and the straight passage $f^2$ with the latter. In order that the cap may tightly fit the end of the nozzle C and the end of the casing, I have arranged therein the ring of packing, $f^3$, held against the outer flange of the cap, and a smaller ring of packing, $f^4$, held in the cup or sleeve $f^5$, which surrounds the end of the passage $f^2$ to the nozzle C, and when the cap is applied to the casing these two rings of packing serve to pack the joints between the nozzle and the cap and the casing and the cap.

It is not necessary that the nozzle should extend through the chamber or cavity $a^2$, and in Fig. 5 I have represented it as arranged upon one side thereof.

In Fig. 6 I have represented a construction which I employ when I do not use the two-way cock and nozzle for a single stream, and it is in substance like the casing above described, the only distinction being that it is unprovided with the single-stream passage or nozzle and is adapted to be secured to the end of a nozzle or pipe having an ordinary cock or valve. In Fig. 6 I have represented the chamber or cavity as provided with a perforated plate, G, movable toward the inner end of the chamber by a spring, g. The object of this perforated plate is to hold the ingredient or composition together as it is dissolved or wasted away by the action of the water, so that the water shall always be obliged to pass through a body or mass of it arranged in a somewhat compact form in the chamber or cavity.

The device may be used with any ingredient or composition adapted to be resolved into a liquid form by the use of water under pressure, and with it to be distributed in a spray or in drops, and it is especially applicable for horticultural purposes.

In use the cap is removed and the chamber or cavity filled with the composition, ingredient, or material which it is desired to apply in the form of spray or fine drops—for instance, whale-oil soap—and the cap is then replaced and the water turned on under sufficient pressure to cause it to leave the chamber in the form of fine spray or drops. This pressure, of course, can be varied as desired. The water being thus forced through the soap causes it to be gradually dissolved and to be thoroughly mixed with it, so that the spray is a mixture of water and whale-oil soap. I mention the use of whale-oil soap simply to illustrate the operation of the device. Any other ingredient or composition which can be thus treated may be used.

It is essential in most cases that the perforated diaphragm B be used, for otherwise there would be a tendency to clog the small perforations in the bottom or end of the casing; but the use of the perforated diaphragm with a clear space between it and the bottom prevents this from occurring.

It is not necessary that the plate G be perforated, and for some purposes or uses it is desirable that it should not be. When it is not perforated, however, it is made sufficiently small to provide a water-space between its edge and the casing.

I would not be understood as limiting myself to the specific construction herein shown and described, and would say that the device provides a very efficient water-sprinkler when arranged and combined to include a nozzle for a single stream, a distributing-chamber having small perforations, a coupling for connecting it with a hose or other source of supply, and a two-way cock or valve with passages connecting the valve-chamber with the distributer and with the passage of the nozzle, whereby each may be used in succession or alternately by simply turning the cock or valve.

Having thus fully described my invention, I claim and desire to secure by Letters Patent of the United States—

1. The combination, with the coupling-section E, having a suitable cock and a cap, D, of the casing A, removably attached to the said cap and having its end opposite to the said cap perforated, and a perforated diaphragm, B, within the said casing and adjacent to but separated from the said perforated end, substantially as set forth.

2. The combination, with the coupling-section E, having the two-way cock F, the passages $f'$ and $f^2$, and the cap D, of a nozzle, C, opening into the said passage $f^2$, the casing A, communicating interiorly with the said passage $f'$ and having the perforated end $a$, and the perforated diaphragm B within the said casing and adjacent to but separated from the said perforated end $a$, substantially as set forth.

3. The combination of the casing A, having the chamber $a^2$ and perforated bottom or end $a$, with the removable cap D and a spring-operated plate, G, substantially as described.

JOHN BENEDICT WARREN.

In presence of—
F. F. RAYMOND, 2d,
J. M. DOLAN.